United States Patent [19]

Pawelek

[11] Patent Number: 4,680,715
[45] Date of Patent: Jul. 14, 1987

[54] METHOD FOR NAVIGATING VEHICLES, PARTICULARLY LAND VEHICLES

[75] Inventor: Bernd-Christian Pawelek, Wiesloch, Fed. Rep. of Germany

[73] Assignee: Teldix GmbH, Heidelberg, Fed. Rep. of Germany

[21] Appl. No.: 734,141

[22] Filed: May 15, 1985

[30] Foreign Application Priority Data

May 16, 1984 [DE] Fed. Rep. of Germany ....... 3418081

[51] Int. Cl.$^4$ ............................................. G06F 15/50
[52] U.S. Cl. .................................... 364/449; 364/424; 364/571; 340/988
[58] Field of Search ............... 364/424, 443, 449, 450, 364/454, 571; 73/178 R; 340/988; 342/450, 451

[56] References Cited

U.S. PATENT DOCUMENTS

| 3,702,477 | 11/1972 | Brown | 364/453 |
| 4,114,437 | 9/1978 | Krogmann | 364/450 |
| 4,144,571 | 3/1979 | Webber | 364/450 |
| 4,161,730 | 7/1979 | Anderson | 343/6.5 R |
| 4,520,445 | 5/1985 | Keearns | 364/454 |

FOREIGN PATENT DOCUMENTS 2020019 11/1979 United Kingdom .

OTHER PUBLICATIONS

"Vehicle Navigation System FNA 4-15" Operation Manual, Teldix GmbH, Heidelberg, published prior to Oct. 8, 1975, pp. 5-34, and FIGS. I-V.

Primary Examiner—Gary Chin
Attorney, Agent, or Firm—Spencer & Frank

[57] ABSTRACT

A navigation method for the navigation of a vehicle employing direction and longitudinal movement sensors. Signals from the sensors are fed to a position computer which determines the vehicle position relative to a coordinate grid system. When the vehicle reaches a position of known coordinates the position values which are determined from the sensor signals are corrected with reference to the known coordinates, and a Kalman filter is provided which effects an error estimate and subsequently a correction value determination from the error estimate which results in a significant increase in accuracy of the displayed navigation data. The particular advantage of the method is the use of uncomplicated sensors which are able, in connection with the Kalman filter, to obtain highly accurate vehicle position data.

3 Claims, 4 Drawing Figures

METHOD FOR NAVIGATING VEHICLES, PARTICULARLY LAND VEHICLES

BACKGROUND OF THE INVENTION

The present invention relates to a method for the navigation of a vehicle, wherein the vehicle includes a course reference device which furnishes a course signal which represents the direction of the vehicle with reference to an earthbound coordinate system; a longitudinal movement sensor for detecting longitudinal movement of the vehicle and generating a longitudinal movement signal; a position computer for calculating vehicle position data, segregated into north and east position values, from signals generated by the course reference device and the longitudinal movement sensor; display means connected to the position computer for displaying vehicle position data calculated by the position computer; and input means including manual input means and signal receiving means for providing, respectively, additional position data and course, velocity and path data for navigation support.

A navigation system of this type is described in German Pat. No. 3,033,279. Such a navigation system is used for determining the position of a vehicle in a grid coordinate system, namely the UTM (Universal Transverse Mercator) grid system. The vehicle position is determined from the course angle furnished by a course reference device with reference to the UTM grid coordinate system and from distance signals obtained by integration of the vehicle speed. Position errors occurring during travel, which have no linear relationship to the path traveled or the travel time, are eliminated in that, at the moment at which the vehicle is at a known point in the terrain, a comparison is made between the displayed location and the actual location of the vehicle, a path adaptation factor is determined and the course angle is corrected.

However, it has been found to be desirable to correct the indicated positon not only when a known terrain point is reached, but also to make a correction of the displayed data continuously and in a discrete-time manner.

SUMMARY OF THE INVENTION

It is therefore an object of the present invention to provide a navigation system which, with the use of simple sensors, furnishes all navigation data with the greatest accuracy, with such accuracy remaining constant over time.

The above and other objects of the invention are accomplished by a method for navigation of a vehicle in the context of a vehicle which includes: a course reference means for furnishing a course angle signal $\theta M$ which represents the direction of the vehicle with reference to an earthbound coordinate system; longitudinal movement sensor means for detecting longitudinal movement of the vehicle and generating a longitudinal movement signal VM corresponding to the longitudinal movement of the vehicle; position computer means for calculating vehicle position data, segregated into north and east position values, from signals generated by the course reference means and the longitudinal movement sensor means; display means connected to the position computer for displaying vehicle position data calculated by the position computer; and input means including at least one of manual input means and the signal receiving means for providing navigation support data including at least one of additional position, course, velocity and path data; said method comprising:

checking the longitudinal movement signal VM and the course angle signal $\theta M$ for plausibility;

adding a known, empirically derived, deterministic velocity error component signal DF(V) to the VM signal and a known, emipirically derived, deterministic course angle error component value to the $\theta M$ signal to produce, respectively, a corrected longitudinal movement signal CV and a corrected course angle signal $C\theta$;

optimally estimating, with the use of a Kalman filter, the stochastic position and direction errors resulting from the VM and $\theta M$ signals and using such errors to calculate direction and change-in-direction correction values $C(\theta)$ and $C(\epsilon)$, respectively, and north and east position correction values C(RN) and C(RE), respectively;

adding the direction correction value $C(\theta)$ to the $\theta M$ signal;

feeding the position correction values C(RN) and C(RE) to the position computer means for use in correcting the position data;

forming corrected north and east component signals CVN and CVE, respectively, from the corrected longitudinal vehicle movement signal CV and from the corrected course angle signal $C\theta$ and feeding the CVN and CVE signals to the position computer means;

calculating, with the use of the position computer means, corrected north and east position coordinate values CRN and CRE, respectively, in dependence of the C(RN) and C(RE) correction values and the CVN and the CVE corrected north and east component signals;

obtaining north and east position bearing data $RNS^{(iP)}$ and $RES^{(iP)}$, respectively, from the input means;

comparing the corrected north and east position coordinate values CRN and CRE with the position bearing data $RNS^{(iP)}$ and $RES^{(iP)}$, respectively, to form north and east position bearing signals $CZN^{(iP)}$ and $CZE^{(iP)}$, respectively; and feeding the $CZN^{(iP)}$ and $CZE^{(iP)}$ signals to the Kalman filter, with the Kalman filter developing the following error model of the vehicle course angle error:

$$\Delta\theta(t)=\Delta\theta_1(t)+\Delta\theta_2(t)+\Delta\theta_3(t),$$

wherein $\Delta\theta_1(t)$ comprises a component of exponentially, time correlated, colored noise; $\Delta\theta_2(t)$ comprises a time linearly variable component representing drift angle with an unknown starting value $\Delta\theta_2(O)$ and an unknown pitch $\epsilon(t)$ representing a random ramp process; and $\Delta\theta_3(t)$ comprises a component of Gaussian white, time uncorrelated, noise; and wherein the component $\Delta\theta_1(t)$ is described by a form filter excited with white noise in a Gauss-Markov process of the first order, error which is contained in the position bearing data, $RNS^{(iP)}$ and $RES^{(iP)}$, is developed solely be stationary Gaussian white, time uncorrelated, noise and $C(\theta)$, $C(\epsilon)$, C(RN), C(RE), CVN, CVE, CRN, CRE, $RNS^{(iP)}$, $RES^{((iP)}$, $CZN^{(iP)}$, $CZE^{(iP)}$, $\Delta\theta(t)$, $\Delta\theta_2(t)$, $\Delta\theta_3(t)$ and $\epsilon(t)$ are defined in the detailed description below.

A significant advantage of the invention lies in the provision of a navigation system which receives navigation signals from sensors in the vehicle, such as the course and velocity or path sensors, as well as from additional input means, and forms, by means of the use of a modified Kalman filter, optimized navigation data therefrom. Additional input means include, for example, manual input of the position, as well as receiving devices for radio and/or satellite navigation methods known, for example, by the names "Transit" or "GPS Navstar" (see in this connection German Offenlegungsschrift [laid-open patent application] No. 2,043,812).

According to a further feature of the invention, course and/or longitudinal vehicle movement support data are derived from the signals of a satellite navigation system and compared with the corrected signals of the course reference device and/or the signals of the longitudinal vehicle movement sensor. The comparison data are then likewise fed to the error behavior model forming block and to the Kalman filter.

According to yet another feature of the invention, a compensation of stochastic longitudinal vehicle movement error components is accomplished in addition to the compensation of deterministic course and velocity error and the stochastic course error components, for which purpose corresponding velocity correction values (C(V)) are formed by means of the Kalman filter longitudinal movement error estimation and these correction values are added to the longitudinal movement signals VM of the vehicle.

DESCRIPTION OF THE PREFERRED EMBODIMENTS

Figure 1:
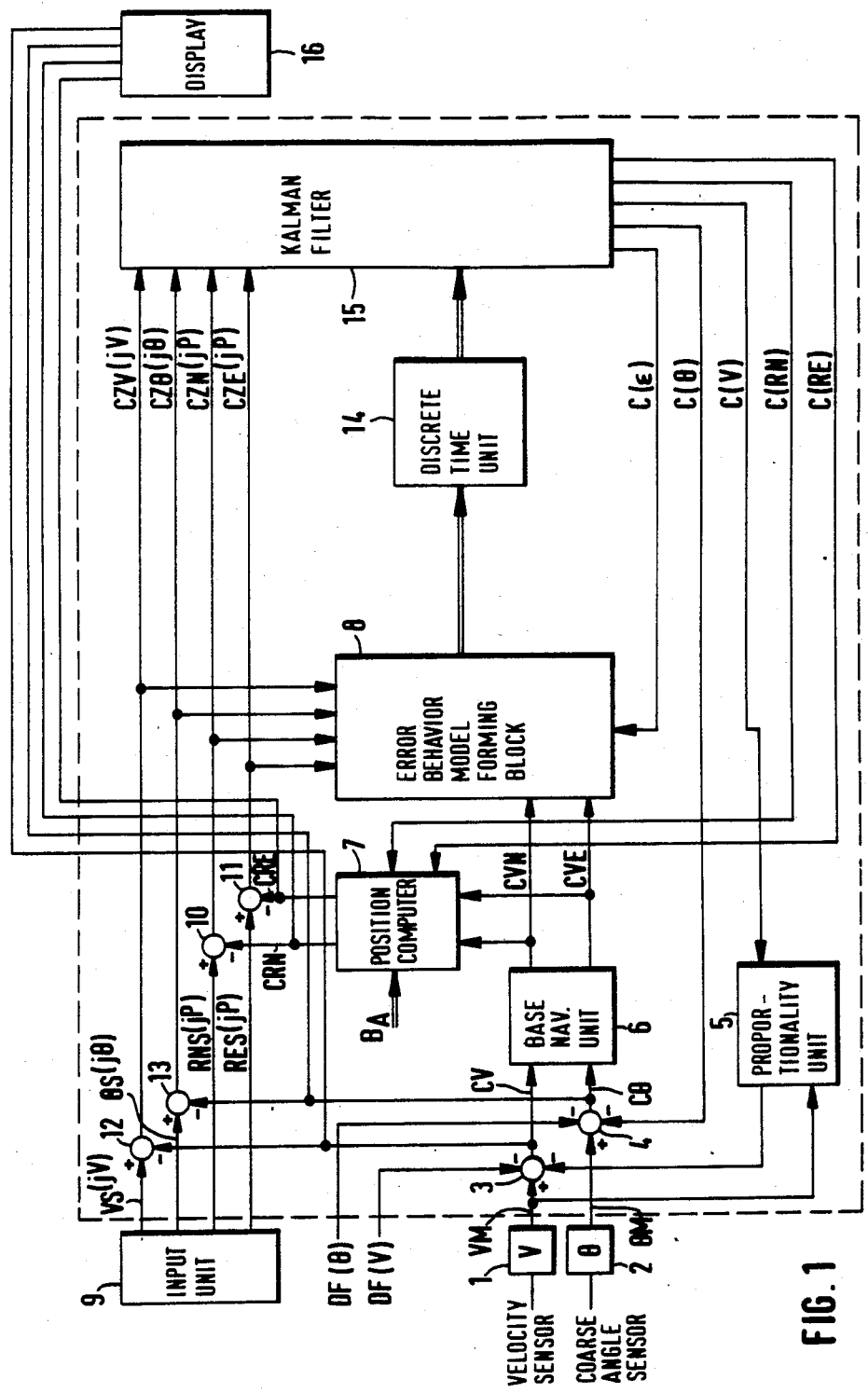
FIG. 1 is a block circuit diagram of a navigation system employing a Kalman filter for implementing the method according to the invention.

Referring to FIG. 1, there is shown a navigation system as it is used, for example, in a land vehicle. Longitudinal vehicle movement is sensed by a velocity sensor 1 which produces a measured speed value (VM), and course direction is detected by a direction sensor 2, for example a course gyro, which produces a measured course angle ($\theta$M) value. Velocity sensor 1 and direction sensor 2 are of known design, for example as described in the "Operation Manual, Vehicle Navigation System FNA 4-15", provided by Teldix GmbH of Heidelberg, Federal Republic of Germany. The measured values (VM) and ($\theta$M) furnished by sensors 1 and 2, respectively, are values which include errors and are thus checked for plausibility based upon changes in course and velocity, maximum value determinations and statistical diagnosis calculation concepts such as, mean value and variance estimates. Such errors are, in particular, due to seeming drift, random drift, wheel slip and the like. Therefore, known deterministic error component values (DF(V)) and (DF($\theta$)), which are empirically derived values, are added to the measured values at linkage points 3, 4. Moreover, direction (course angle) correction values (C($\theta$)) and velocity correction values (C(V)) furnished by a Kalman filter to be described in greater detail below are added at these linkage points, with (C(V)) being adapted to the actually measured velocity values from the velocity sensor via a proportionality device 5 which generates a proportionality factor.

The thus corrected signals for velocity and course are fed to a base navigation unit 6 which segregates the velocity into component values for north and east and feeds these values to position computer 7 and an error behavior model forming block 8 to determine the error ratio.

Position computer 7 also receives starting conditions ($B_A$), such as original location, starting orientation of the course gyro and of the vehicle, starting time and starting speed for determining the dead reckoning position in the north and east directions. If the vehicle reaches a terrain point for which the coordinates are known, for example a certain geodetic point, then the coordinates of that point are fed to the navigation system through an input unit 9 and are compared at linkage points 10 and 11, respectively, with respective ones of the north and east values of the dead reckoning position.

Input unit 9 additionally serves as a display means for radio and/or satellite navigation devices which may be provided in the vehicle, and which are able to furnish the actual vehicle position information, which also must be checked for plausibility, and corresponding course and/or velocity data. In this case, not only are the position signals from the radio and/or satellite navigation systems compared with the dead reckoning position but additionally comparisons are made at linkage points 12 and 13, respectively, between the corresponding velocity and/or course signals and the corrected signals from the velocity sensor 1 and/or direction sensor 2. Any existing deviations in position in the two coordinate directions ($CZN^{(jP)}$), ($CZE^{(jP)}$), as well as the course and/or velocity differences ($CZ\theta^{(jP)}$) and/or ($CZV^{(jV)}$), respectively, are fed to the error behavior model forming block 8 as well as to Kalman filter 15.

In addition to the already mentioned direction and velocity correction values (C($\theta$)) and (C(V)), the Kalman filter also furnishes direction change corrections C($\epsilon$) which are fed to the error behavior model forming block 8, as well as position correction values in the north and east directions (C(RN)) and (C(RE)), respectively, which are additionally fed to position computer 7 for a correction of the dead reckoning position data.

Kalman filter 15 serves to estimate all of the modelled navigation errors.

The thus extrapolated navigation errors are utilized to calculate the above-mentioned correction values which are returned to the navigation system for the compensation of errors. The thus designed system forms a closed control circuit which automatically furnishes the "optimally" corrected navigation values which can be displayed by a suitable display means 16.

Figure 3:
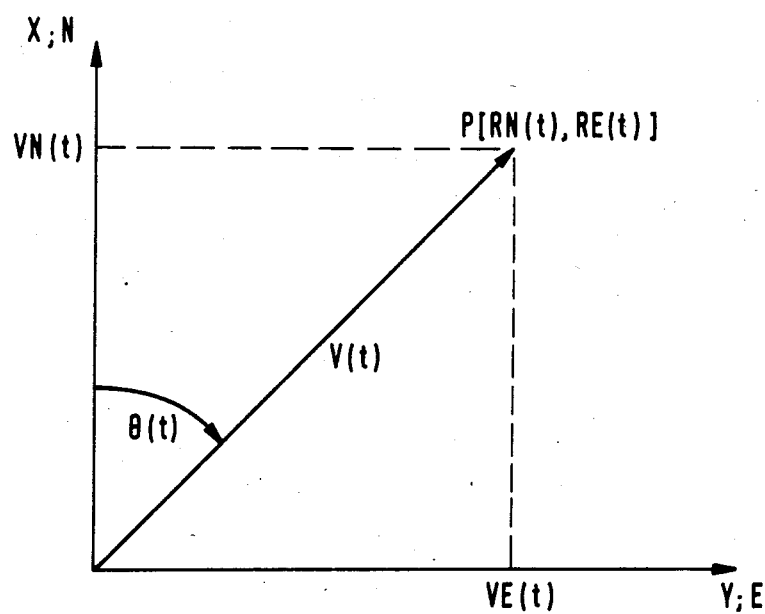
FIG. 3 is a diagram showing a dead reckoning position.

The starting point of the method of the invention is in the so-called base navigation system, which is composed of direction sensor 2 (course gyro) as well as the velocity sensor 1. For the case of "navigation in the plane", the physical base navigation equations, i.e. equations for dead reckoning navigation from vehicle speed V(t) and course angle $\theta$(t) (see FIG. 3), are as follows:

$$RN(t) = \int_{t_0}^{t} VN(t)dt = \int_{t_0}^{t} V(t) \cdot \cos\Theta(t)\, dt \quad (1)$$

$$RE(t) = \int_{t_0}^{t} VE(t)dt = \int_{t_0}^{t} V(t) \cdot \sin\Theta(t) \, dt \quad (2)$$

where $RN(t)$ and $RE(t)$ are the vehicle positions in the north (N) and east (E) directions, respectively.

$VN(t)$ and $VE(t)$ are the vehicle speeds in the north (N) and east (E) directions, respectively, and $t$ is time As already mentioned above, the vehicle position values resulting from dead reckoning according to Equations (1) and (2) are wrong due to the errors made by the course and velocity sensors and such errors are corrected by navigation support data—it being assumed that these also contain errors.

Figure 4:
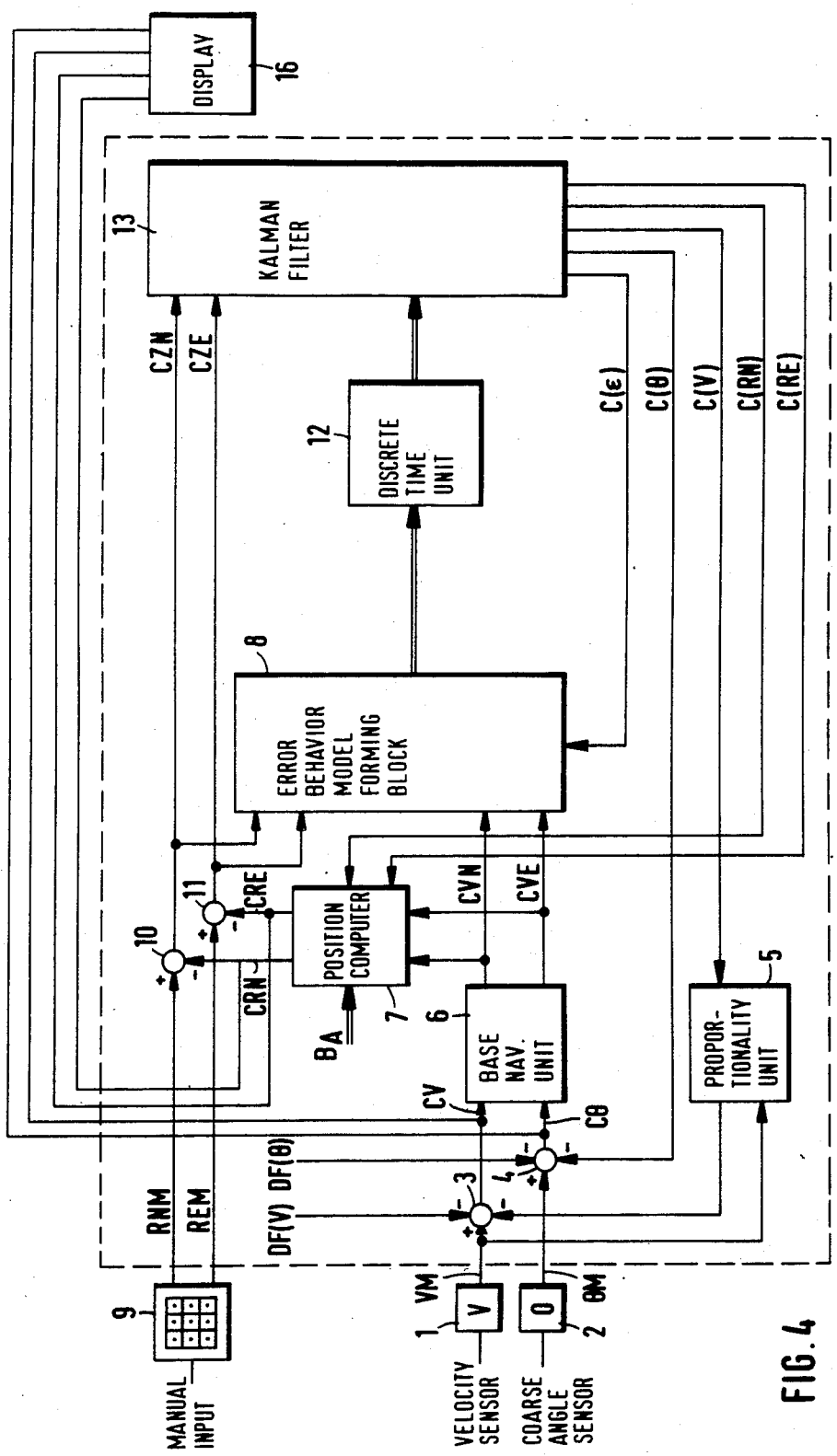
FIG. 4 is a block circuit diagram for a simple navigation system with Kalman filter employing only manual position input which can be used to implement the method according to the invention.

Below is a description of the formulation of the error behavior model forming and Kalman filter algorithms for the case in which position data are fed in from time to time exclusively by manual input means, such as that described in Teldix Operation Manual for the FNA 4-15 Vehicle Navigation System referred to above and as diagrammatically shown in FIG. 4. Input unit 9' in FIG. 1 also accepts position data which is fed in manually as well as additional navigation support data which it receives via radio and/or satellite receiving devices as previously noted. The following model assumptions are then made for the individual measured values:

Measured vehicle velocity signal $VM(t)$ from velocity sensor and checked for plausibility:

$$VM(t) = V(t) + \Delta V(t) \quad (3)$$

where $\Delta V(t)$ is the error-free vehicle speed, and
$V(t)$ is the velocity error Measured course angle signal $\theta M(t)$ from direction sensor and checked for plausibility:

$$\theta M(t) = \theta(t) + \Delta\theta(t) \quad (4)$$

where $\theta(t)$ is the error-free course angle and
$\Delta\theta(t)$ is the course angle error Measured vehicle position (position fix) $RNS(t)$, $RES(t)$:

$$RNS(t) = RN(t) + \Delta RNS(t) \quad (5)$$

$$RES(t) = RE(t) + \Delta RES(t) \quad (6)$$

where $RN(t)$ and $RE(t)$ are error-free vehicle positions in the north (N) and east (E) directions, respectively; and $\Delta RNS(t)$ and $\Delta RES(t)$ are the position measurement (bearing) errors in the north (N) and east (E) directions, respectively.

For the "real" base navigation system, Equations (1), (2), (3) and (4) provide the following continuous-time system equations:

$$R\dot{N}^{FOA}(t) = VNM(t) = VM(t) \cdot \cos\theta M(t) \quad (7a)$$

$$R\dot{E}^{FOA}(t) = VEM(t) = VM(t) \cdot \sin\theta M(t) \quad (7b)$$

where $RN^{FOA}(t)$ and $RE^{FOA}(t)$ are erroneous position coordinates of the vehicle navigation/orientation system (FOA) determined from the measured base navigation values by means of dead reckoning.

The continuous-time measurement (bearing) equations are obtained by a comparison of the location resulting from dead reckoning ($RN^{FOA}(t)$, $RE^{FOA}(t)$) with the measured (position fix) vehicle position ($RNS(t)$, $RES(t)$), respectively. This means:

$$ZN(t) = RNS(t) - RN^{FOA}(t) \quad (8a)$$

$$NE(t) = RES(t) - RE^{FOA}(t) \quad (8b)$$

where $ZN(t)$ and $ZE(t)$ are the differences between dead reckoning and bearing in the north (N) and east (E) directions, respectively.

CONTINUOUS-TIME ERROR EQUATIONS

The use of the error propagation theorem for Equations (7a/7b) as well as (8a/8b) furnishes the following error equations:

Errors in the base navigation system→system errors:

$$\Delta R\dot{N}(t)\} = \cos\theta M(t) \cdot \Delta V(t) - VEM(t) \cdot \Delta\theta(t) \quad (9a)$$

$$\Delta R\dot{E}(t)\} = \sin\theta M(t) \cdot \Delta V(t) + VNM(t) \cdot \Delta\theta(t) \quad (9b)$$

where $\Delta\dot{R}N(t)$ and $\Delta\dot{R}E(t)$ are position errors after dead reckoning.

Errors due to position bearings (fixes)→measuring errors:

$$\Delta ZN(t) = \Delta RNS(t) = \Delta RN(t) = ZN(\epsilon) \quad (10a)$$

$$\Delta ZE(t) = \Delta RES(t) = \Delta RE(t) = ZE(\epsilon) \quad (10b)$$

where $\Delta ZN(t)$ and $\Delta ZE(t)$ are position error differences in the north (N) and east (E) directions, respectively, with the individual errors being modelled as follows:

Velocity error modelling

With the assumption that the (stochastic) speed error can be modelled by a sum of (time) correlated, i.e. colored noise (describable by Guass-Markov processes of the first order) and Gaussian white, i.e. (time) uncorrelated, noise, the following results:

$$\Delta V(t) = \Delta V_1(t) + \Delta V_2(t) \quad (11)$$

where the following definitions apply:

$\Delta\dot{V}_1(t) = -\beta_{V1}(t) \cdot \Delta V_1(t) + W_{V1}(t) =$ form filter description for the error component in the Gauss-Markov process of the first order;

$\beta_{V1} =$ reciprocal autocorrelation time of the form filter;

$\Delta V_1(O) \sim N[O; E(\Delta V_1^2(O)) = \sigma_{V1}^2] =$ abbreviated form for the starting value $\Delta V_1(O)$ of the Gauss-Markov error component with normal (N) distribution, starting mean O and starting variance $\sigma_{V1}^2(O) = \sigma_{V1}^2$;

$W_{V1}(t) = q_{V1} \cdot W(t) \sim N[O; E(W_{V1}^2(t)) = q_{V1}^2] =$ abbreviated form for the stationary white noise which drives the form filter with normal (N) distribution, mean O and spectral power density $q_{V1}^2$;

$\Delta V_2(t) \sim N[O; E(\Delta V_2^2(t)) = q_{V2}^2] =$ abbreviated form for the error component of stationary white noise with normal (N) distribution, mean O and spectral power density $q_{V2}^2$;

$E(\Delta V_1(t) \cdot \Delta V_2(t)) =$  = abbreviated form for the

-continued $E(W_{V1}(t) \cdot \Delta V_2(t)) = 0$  assumption that $\Delta V_1(t)$ and $\Delta V_2(t)$ are uncorrelated with one another.

Course angle error modelling

For forming the model of the (stochastic) course angle error, it is assumed that the latter is additively composed of a component of exponentially (time) correlated (colored) noise $\Delta\theta_1(t)$, a component $\Delta\theta_2(t)$ which is linearly variable in time (drift angle) having an unknown starting value $\Delta\theta_2(O)$ and unknown pitch $\epsilon(t)$ (random ramp process) as well as a component of Gaussian white, i.e. (time) uncorrelated, noise $\Delta\theta_3(t)$. The error component $\Delta\theta_1(t)$ can here again be described by the form filter excited by white noise in the Gauss-Markov process of the first order. As a whole, the following course angle error model is then obtained:

$$\Delta\theta(t) = \Delta\theta_1(t) + \Delta\theta_2(t) + \Delta\theta_3(t) \tag{12}$$

where $\Delta\dot{\theta}_1(t) = -\beta_{\theta1} \cdot \Delta\theta_1(t) + W_{\theta1}(t) =$ form filter description for the error component in the Gauss-Markov process of the first order;

$\beta_{\theta1} =$ reciprocal autocorrelation time of the form filter;

$\Delta\theta_1(O) \sim N[O; E(\Delta\theta_1^2(O)) = \sigma_{\theta1}^2] =$ abbreviated form for the starting value $\Delta\theta_1(O)$ of the Gauss-Markov error component with normal (N) distribution, starting mean O and starting variance $\epsilon_{\theta1}^2(O) = \epsilon_{\theta1}^2$;

$W_{\theta1}(t) = q_{\theta1} \cdot W(t) \sim N[O; E(W_{\theta1}^2(t)) = q_{\theta1}^2] =$ abbreviated form for the stationary white noise which drives the form filter with normal (N) distribution, mean O and spectral power density $q_{\theta1}^2$;

$\Delta\dot{\theta}_2(t) = \epsilon(t)$ = mathematical model for the error component in the random-ramp process;
$\dot{\epsilon}(t) = 0$ $\Delta\theta_2(O) \sim N[O; E(\Delta\theta_2^2(O)) = \sigma_{\theta2}^2]$ = abbreviated form for the starting values $\Delta\theta_2(O)$ and $\epsilon(O)$ of the random-ramp error component with normal (N) distributions, starting mean 0 and starting variances $\sigma_{\theta2}^2(0) = \sigma_{\theta2}^2$ and $\sigma_\epsilon^2(0) = \sigma_\epsilon^2$;
$\epsilon(0) \sim N[O; E(\epsilon^2(O)) = \sigma_\epsilon^2]$ $\Delta\theta_3(t) \sim N[O; E(\Delta\theta_3^2(t)) = q_{\theta3}^2] =$ abbreviated form for the error component of stationary white noise with normal (N) distribution, mean O and spectral power density $q_{\theta3}^2$;

$E(\Delta\theta_1(t) \cdot \Delta\theta_2(t)) = E(\Delta\theta_1(t) \cdot \Delta\theta_3(t))$
$= E(\Delta\theta_2(t) \cdot \Delta\theta_3(t)) = 0$:
$E(W_{\theta1}(t) \cdot \Delta\theta_2(t)) = E(W_{\theta1}(t) \cdot \Delta\theta_3(t))$
$= 0$  = abbreviated form for the assumptions that $\Delta\theta_1(t)$, $\Delta\theta_2(t)$ [$\epsilon(t)$] and $\Delta\theta_3(t)$ are not correlated with one another.

Position error modelling

The mathematical modelling of the errors occurring during position fixes (bearings) is effected under the assumption that they can be described by Gaussian white, i.e. normally distributed, uncorrelated, noise. In vector representation, this results in the following position error model;

$$\underline{\Delta RS}(t) = \begin{bmatrix} \Delta RNS(t) \\ \Delta RES(t) \end{bmatrix} = \begin{bmatrix} \Delta RNS^{WR}(t) \\ \Delta RES^{WR}(t) \end{bmatrix} = \underline{\Delta RS}^{WR}(t) \tag{13}$$

with $\Delta RS^{WR}(t) \sim N[\underline{O}; V(t)]$ and $$V(t) = V = E(\underline{\Delta RS}^{WR}(t) \cdot (\underline{\Delta RS}^{WR}(t))^T) = \begin{bmatrix} \sigma_N^2 & 0 \\ 0 & \sigma_E^2 \end{bmatrix}$$

= vector of the position error components ($\Delta RNS^{WR}(t)$, $\Delta RES^{WR}(t)$) which are each abbreviated by stationary white noise with normal (N) distribution, and are developed by the mean vector $\underline{O}$ as well as the covariance or spectral density matrix $V$, respectively, with the individual variances $\sigma_N^2$ and $\sigma_E^2$.

$(\ldots)^T =$ transponent of a vector or a matrix

By inserting Equations (11) through (13) into Equations (9) and (10), the following equation systems are obtained which describe the entire error behavior of the present navigation system:

Continuous-time system error equations:

$$\Delta\dot{RN}(t) = \cos\theta M(t) \cdot \Delta V_1(t) - VEM(t) \cdot \Delta\theta_1(t) - \tag{14a}$$
$$VEM(t) \cdot \Delta\theta_2(t) + \cos\theta M(t) \cdot \Delta V_2(t) - VEM(t) \cdot \Delta\theta_3(t)$$

$$\Delta\dot{RE}(t) = \sin\theta M(t) \cdot \Delta V_1(t) + VNM(t) \cdot \Delta\theta_1(t) + \tag{14b}$$
$$VNM(t) \cdot \Delta\theta_2(t) + \sin\theta M(t) \cdot \Delta V_2(t) + VNM(t) \cdot \Delta\theta_3(t)$$

$$\Delta\dot{V}_1(t) = -\beta_{V1} \cdot V_1(t) + W_{V1}(t) \tag{14c}$$

$$\Delta\dot{\theta}_1(t) = -\beta_{\theta1} \cdot \Delta\theta_1(t) + W_{\theta1}(t) \tag{14d}$$

$$\Delta\dot{\theta}_2(t) = \epsilon(t) \tag{14e}$$

$$\dot{\epsilon}(t) = 0 \tag{14f}$$

Continuous-time measurement (bearing) error equations:

$$\Delta ZN(t) = -\Delta RN(t) + \Delta RNS^{WR}(t) \tag{15a}$$

$$\Delta ZE(t) = -\Delta RE(t) + \Delta RES^{WR}(t) \tag{15b}$$

The space state representation of the above equations suitable for design of a Kalman filter, after introduction of the following:

State vector:

$$\Delta\underline{X}(t) = (\Delta RN(t), \Delta RE(t); \Delta V_1(t); \Delta\theta_1(t), \Delta\theta_2(t), \epsilon(t))^T \tag{16}$$

System noise vector:

$$\underline{W}(t) = (\Delta V_2(t); \Delta\theta_3(t); W_{V1}(t); W_{\theta1}(t))^T \tag{17}$$

Measurement (bearing) vector:

$$\Delta \underline{Z}(t) = (\Delta ZN(t), \Delta ZE(t))^T \quad (18)$$

Measurement (bearing) noise vector:

$$\underline{V}(t) = \Delta \underline{RS}^{WR}(t) = (\Delta RNS^{WR}(t), \Delta RES^{WR}(t))^T \quad (19)$$

provides:

$$\left. \begin{array}{l} \Delta \underline{\dot{X}}(t) = A(t) \cdot \Delta \underline{X}(t) + \underline{W}(t) \\ \underline{W}(t) = D(t) \cdot \underline{\overline{W}}(t) \\ \Delta \underline{X}(t=0) = \Delta \underline{X}_o \end{array} \right\} = \text{system error equation} \quad (20)$$

$$\Delta \underline{Z}(t) = M(t) \cdot \Delta \underline{X}(t) + \underline{V}(t) = \text{measurement (bearing) error equation} \quad (21)$$

Equations (20) and (21) thus define the error values at the output of error behavior model forming block 8.

System matrix A(t):

$$A(t) = \begin{bmatrix} 0 & 0 & \cos\Theta M(t) - VEM(t) & -VEM(t) & 0 \\ 0 & 0 & \sin\Theta M(t) + VNM(t) & +VNM(t) & 0 \\ 0 & 0 & -\beta_{V1} & 0 & 0 & 0 \\ 0 & 0 & 0 & -\beta_{\Theta 1} & 0 & 0 \\ 0 & 0 & 0 & 0 & 0 & 1 \\ 0 & 0 & 0 & 0 & 0 & 0 \end{bmatrix} \quad (22)$$

System noise input matrix D(t):

$$D(t) = \begin{bmatrix} \cos\Theta M(t) - VEM(t) & 0 & 0 \\ \sin\Theta M(t) + VNM(t) & 0 & 0 \\ 0 & 1 & 0 \\ 0 & 0 & 1 \\ 0 & 0 & 0 \\ 0 & 0 & 0 \end{bmatrix} \quad (23)$$

Measurement (bearing) matrix M(t):

$$M(t) = M = \begin{bmatrix} -1 & 0 & 0 & 0 & 0 & 0 \\ 0 & -1 & 0 & 0 & 0 & 0 \end{bmatrix} \quad (24)$$

System noise matrix Q(t):

$$\begin{aligned} Q(t) &= E(\underline{W}(t) \cdot \underline{W}^T(t)) = D(t) \cdot E(\underline{\overline{W}}(t) \cdot \underline{\overline{W}}^T(t)) \cdot D^T(t) \\ &= D(t) \cdot \overline{Q}(t) \cdot D^T(t) \end{aligned} \quad (25)$$

where $$\overline{Q}(t) = \overline{Q} = \begin{bmatrix} q_{V2} & 0 & 0 & 0 \\ 0 & q_{\Theta 3}^2 & 0 & 0 \\ 0 & 0 & q_{V1}^2 & 0 \\ 0 & 0 & 0 & q_{\Theta 1}^2 \end{bmatrix}$$

$$E(W(t)) = D(t) \cdot E(\overline{W}(t)) = O$$

Measurement (support) noise matrix V(t):

$$V(t) = E(\underline{V}(t) \cdot \underline{V}^T(t))$$

where $$V(t) = V = \begin{pmatrix} \sigma_N^2 & 0 \\ 0 & \sigma_E^2 \end{pmatrix} \quad (26)$$

and $$E(V(t)) = O.$$

Uncorrelated system and measurement noise:

$$\begin{aligned} E(\underline{W}(t) \cdot \underline{V}^T(t)) &= D(t) \cdot E(\underline{\overline{W}}(t) \cdot \underline{V}^T(t)) = \\ E(\underline{V}(t) \cdot \underline{W}^T(t)) &= E(\underline{V}(t) \cdot \underline{\overline{W}}^T(t)) \cdot D^T(t) = 0 \end{aligned} \quad (27)$$

Providing discrete time

The present navigation system can be realized or simulated with the aid of a digital computer, particularly a microcomputer, for example, a fixed program system of two or three microprocessors, such as Motorola MC 68000 microprocessors integrated with GPS Navstar. The blocks within the dashed lines of FIGS. 1 and 4 can be realized by such a microprocessor system. For such a digital system, the continuous-time system and measurement error (differential) equations (14) and (15) and (16) through (27), respectively, must be converted to discrete-time differential equations—the position fixes (bearings) being taken at discrete instants in time in any case.

Figure 2:
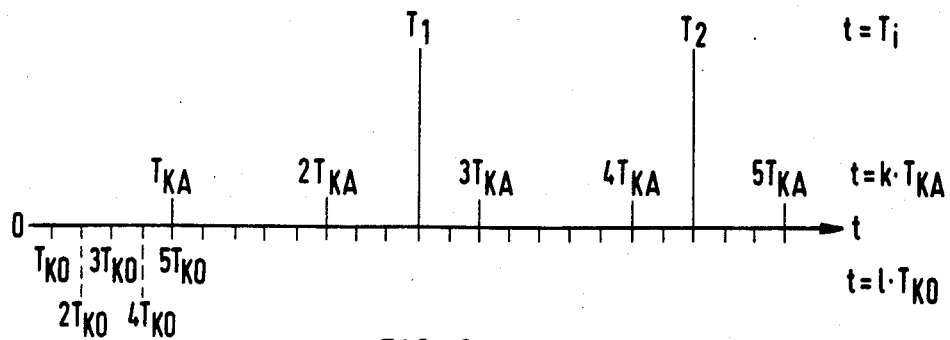
FIG. 2 is a time sequence diagram for the individual steps of the method according to the invention.

The "time axis" shown in FIG. 2 is intended to explain the connections between continuous time t, the processing times required to implement the dead reckoning and Kalman filter calculations and the instants in time at which position fixes (bearings) are taken.

The following then apply:

$T_{KO}$ = duration of dead-reckoning cycle within which dead reckoning is performed once;

$T_{KA}$ = duration of a Kalman cycle within which the Kalman filter calculation is performed once;

$T_i$ = instants in time at which position fixes (bearings) are taken, i = 1, 2, 3, ...;

$$t = l \cdot T_{KO} = k \cdot T_{KA} = T_i \quad (28)$$

where l = number of dead reckoning cycles, with l = 0, 1, 2, 3, ...; and k = number of Kalman cycles, with k = 0, 1, 2, 3, ...

DISCRETE-TIME SYSTEM EQUATIONS

The transition from a continuous-time to a discrete-time system takes place in discrete-time conversion block 14 in FIG. 1 by way of a determination of the so-called transition matrix. For this purpose, the broken series set-up is proposed.

With the assumption that the continuous-time system matrix A(t) is constant during one Kalman interval $T_{KA} = (t_k - t_{k-1})$ and that $T_{KA}$ can be selected sufficiently small, the following results for the transition matrix within the time interval $(t_k = kT_{KA}, t_{k-1} = (k-1)T_{KA})$ $$\Phi[kT_{KA}, (k-1)T_{KA}] = \Phi_{k,k-1} = \exp(A(t_K) \cdot T_{KA}) \approx \quad (29)$$

$$I + A(t_K) \cdot T_{KA} \left( + \frac{A^2(t_K)}{2} \cdot T_{KA}^2 + \ldots \right)$$

where
$k = 1, 2, 3, \ldots$;
$A(t_K) =$ system matrix at time $t_k = (k)T_{KA}$; and
$I =$ unit matrix Because the most suitable Kalman cycle duration $T_{KA}$ from a calculation point of view often becomes too large for the above assumption of $A_{k,k-1} =$ constant; $k = 1, 2, 3, \ldots$, $T_{KA}$ is subdivided into $$q = \frac{T_{KA}}{T_{KO}} = wnm > 1 \tag{30}$$

where wnm is a whole number multiple; identical strips $T_{KO} = (t_l - t_{l-1})$ (the dead reckoning cycle duration $T_{KO}$ can be used for this purpose) and the following can then be set up:

$$\Phi_{k,k-1} = \Phi[kqT_{KO}; (k-1)qT_{KO}] = \prod_{l=kq}^{(k-1)q+1} \Phi_{l,l-1} \tag{31}$$

where $$\Phi_{l,l-1} = \exp(A(t_l) \cdot T_{KO}) \approx I + A(t_l) \cdot T_{KO} + \tag{32}$$

$$\left( + \frac{A^2(t_l)}{2} \cdot T_{KO}^2 + \ldots \right)$$

$l = 1, 2, 3, \ldots$ according to Equation (29) and $A(t_l)$ is the system matrix at time $t_l = lT_{KO}$.

In this way, continuous-time system error equation (20) changes to the discrete-time form $$\Delta X_k \tag{33}$$

$\Delta X_O$ is given;
with the discrete-time system noise vector $$\underline{W}_{k-1} = \int_{t_{k-1}}^{t_k} \Phi[t_k, \tau] \cdot D(\tau) \cdot \underline{W}(\tau) d\tau, \tag{34}$$

$k = 1, 2, 3, \ldots$ and $D(\tau)$, $\underline{W}(\tau)$ according to Equations (23) and (17).

Corresponding to the procedure in the determination of the discrete-time system noise vector according to Equation (34), the discrete-time system noise matrix is obtained as follows:

$$Q_{k-1} = E(\underline{W}_{k-1} \cdot \underline{W}_{k-1}^T) \tag{35}$$

$$= \int_{t_{k-1}}^{t_k} \Phi(t_k, \tau) \cdot D(\tau) \cdot \overline{Q} \cdot D^T(\tau) \cdot \Phi^T(t_k, \tau) d\tau$$

where
$E(W_{k-1}) = O$
$k = 1, 2, 3, \ldots$ and
$Q = E(W(\tau)WT t\tau))$ according to Equation (25)

For an approximated calculation of $Q_{k-1}$, the trapezoidal integration method is recommended. Accordingly, the following results:

$$Q_{k-1} = \tag{36}$$

$$(D(t_K) \cdot \overline{Q} \cdot D(t_K) + \Phi_{k,k-1} \cdot D(t_K) \cdot \overline{Q} \cdot D(t_K) \cdot \Phi_{k,k-1}) \cdot \frac{T_{KA}}{2}$$

where $D(t_K)$ is the system noise input matrix at time $t_K = kT_{KA}$.

Since position bearings (fixes) are taken exclusively at discrete instances in time $t = T_i$; $i = 1, 2, 3, \ldots$, continuous-time measurement (bearing) error equation (21) changes to $$\underline{\Delta Z}(t=T_i) = M(t=T_i) \underline{\Delta X}(t=T_i) + \underline{V}(t=T_i) \tag{37}$$

where $M(t = T_i)$ according to Equation (24).
In discrete-time form, this means:

$$\underline{\Delta Z}_k = \begin{cases} M_k \cdot \underline{\Delta X}_k + \underline{V}_k; k = k_i = \frac{T_i}{T_{KA}} \\ \underline{0}; \text{ at other times} \end{cases} \tag{38}$$

$i = 1, 2, 3, \ldots$

Equations (33) and (38) are therefore the main equations for the discrete-time conversion performed in block 14.

For the discrete-time measurement (bearing) noise matrix, the following results:

$$E(\underline{V}_k \underline{V}_k T) = V_k = V = \text{constant} \tag{39}$$

where
$E(\underline{V}_k) = \underline{O}$ and
$V$ is used according to Equation (26)

For discrete-time dead reckoning for a calculation of the dead reckoning position from the actual velocity and course informations, either of the following two methods can be employed:

METHOD 1

In this method, differential equations (7a) and (7b) which describe the "real" base navigation system are put directly in discrete-time form, i.e. the rectangular integration method is used. The following then results as the dead reckoning position at time $t_{l+1} = (l+1)T_{KO}$ $$RN_{l+1}^{FOA} = RN_l^{FOA} + VNM_{l+1} \cdot T_{KO} \tag{40a}$$

$$RE_{l+1}^{FOA} = RE_l^{FOA} + VEM_{l+1} \cdot T_{KO} \tag{40b}$$

$l = 0, 1, 2, 3, \ldots$

METHOD 2

The use of the trapezoidal integration method with Equations (7a) and (7b) furnishes somewhat more accurate results. According to this method, the following results:

$$RN_{l+1}^{FOA} = RN_l^{FOA} + (VNM_{l+1} + VNM_l) \cdot \frac{T_{KO}}{2} \tag{41a}$$

-continued $$RE_{l+1}^{FOA} = RE_l^{FOA} + (VEM_{l+1} + VEM_l) \cdot \frac{T_{KO}}{2} \quad (41b)$$

$l = 0, 1, 2, 3, \ldots$

Discrete-time Kalman filter algorithms (simultaneous bearing data processing)

Discrete-time Kalman filter algorithms suitable for realization by microcomputer are formulated as follows:

Recursive prediction (extrapolation) algorithms for a priori system error estimation A priori estimation error $\Delta \hat{X}_k$ at time $t_k = kT_{KA}$:

$$\Delta \hat{X}_k = \Phi_{k,k-1} \cdot \Delta \hat{X}_{k-1}$$

where $k = 1, 2, 3, \ldots$ $\Delta \hat{X}_0$ = starting estimation error (to be suitably given) (42)

$\Phi_{k,k-1}$ is according to Equation (31)

A priori estimation covariance matrix $P_k^*$ at time $t_k = kT_{KA}$:

$$P_k^* = \Phi_{k,k-1} \cdot \left( P_{k-1} + D(t_K) \cdot \overline{Q} \cdot D(t_K)^T \cdot \frac{T_{KA}}{2} \right) \cdot \Phi_{k,k-1}^T + \quad (43)$$

$$D(t_K) \cdot \overline{Q} \cdot D(t_K)^T \cdot \frac{T_{KA}}{2}$$

where
$k = 1, 2, 3, \ldots$;
$D(t_K)$ is the system noise input matrix at time $t_k = kT_{KA}$; and
$\overline{Q}$ is according to Equation (25)

Starting estimation error covariance matrix $P_o$ (to be suitably given).

$$P_o = \text{Diag}(\sigma_N^2(O), \sigma_E^2(O); \sigma_{V1}^2; \sigma_{\theta 1}^2, \sigma_{\theta 2}^2, \sigma_\epsilon^2) \quad (44)$$

Algorithms for the correction of the a priori system error estimation by measurements (position fixes):

Amplification matrix $B_k$ at time $t_k = kT_{KA}$:

$$B_k = \begin{cases} P_k^* \cdot M^T \cdot [M \cdot P_k^* \cdot M^T + V]^{-1}; & k = k_i = \frac{T_i}{T_{KA}} \\ 0 & \text{at other times} \end{cases} \quad (45)$$

where
$i = 1, 2, 3, \ldots$;
$k = 1, 2, 3, \ldots$;
M is according to Equation (24); and
V is according to Equation (39).

A posteriori estimation error $\Delta \hat{X}_k$ at time $t_k = kT_{KA}$:

$$\Delta \hat{X}_k = \Delta \hat{X}_k^* + \begin{cases} B_k \cdot [Z_k - M \cdot \Delta \hat{X}_k]; & k = k_i = \frac{T_i}{T_{KA}} \\ 0 & ; \text{at other times} \end{cases} \quad (46)$$

where
$i = 1, 2, 3, \ldots$;
$k = 1, 2, 3, \ldots$; and
$Z_k = (ZN(t_k), ZE(t_k))^T$ according to Equations (8a) and (8b);

A posteriori estimation error covariance matrix $P_k$ at time $t_k = kT_{KA}$:

$$P_k = \frac{1}{2} \cdot (\tilde{P}_k + \tilde{P}_k^T) \quad (47)$$

where $$\tilde{P}_k = \quad (48)$$

$$\begin{cases} [I - B_k \cdot M] \cdot P_k^* \cdot [I - B_k \cdot M]^T + B_k \cdot V \cdot B_k^T; & k = k_i = \frac{T_i}{T_{KA}} \\ P_k^* & \text{at other times} \end{cases}$$

and
$i = 1, 2, 3, \ldots$
$k = 1, 2, 3, \ldots$

MODIFIED ALGORITHMS FOR THE CORRECTED NAVIGATION SYSTEM

The discrete-time Kalman filter 15 thus furnishes quasi continuously, in addition to the a priori estimation errors and the a priori and a posteriori estimation error covariance matrices, also the a posteriori estimation errors. From these estimation errors with minimum error variance, "optimum" correction values can now be calculated directly and these are returned to the navigation system for error compensation. The thus resulting navigation system is a closed control circuit, corrected navigation system, which then automatically produces the "optimally" corrected navigation data, i.e. data with minimum errors.

For the corrected navigation system, the modified algorithms as a result of returns are given below.

DISCRETE-TIME MATHEMATICAL MODELS FOR THE CORRECTED MEASUREMENT (INPUT) VALUES (SIGNALS)

Corrected vehicle speed $CV_{k,k-1}$ as provided by the proportionality unit 5 is as follows:

$$CV_{k,k-1} = VM_{k,k-1} - \chi_{k,k-1} \cdot C(V)_{k-1} - DF(V)_{k-1} \quad (49)$$

where $$\chi_{k,k-1} = \begin{cases} \frac{VM_{k,k-1}}{VM_{k-1}} & \text{for } VM_{k-1} > \alpha \text{ [km/h]} \\ 1 & \text{for } VM_{k-1} < \alpha \text{ [km/h]} \end{cases} \quad (50)$$

$k = 1, 2, 3, \ldots$
The following here applies:
$CV_{k,k-1}$ = corrected vehicle speeds during the Kalman interval $(t_k = kT_{KA}, t_{k-1} = (k-1)T_{KA})$, i.e. within a range of $kqT_{KO} > t_1 > (k-1)qT_{KO}$ and $1 = (k-1)q + 1, \ldots, kq$, respectively;
$VM_{k,k-1}$ = measured plausible vehicle speeds during the Kalman interval $(t_k = kT_{KA}, t_{k-1} = (k-1)T_{KA})$, i.e. within a range of $kqT_{KO} > t_l > (k-1)qT_{KO}$ and $1 = (k-1)q + 1, \ldots, Kq$, respectively;
$VM_{k-1}$ = measured plausible vehicle speed at time $t_{k-1} = (k-1)T_{KA}$;
$C(V)_{k-1}$ = correction value for the measured plausible vehicle speed at time $t_{k-1} = (k-1)T_{KA}$;
$DF(V)_{k-1}$ = deterministic speed error at time $t_{k-1} = (k-1)T_{KA}$;

$\chi_{k,k-1}$ = proportionality factor for the vehicle speed correction value $C(V)_{k-1}$ during the Kalman interval ($t_k = kT_{KA}$, $t_{k-1} = (k-1)T_{KA}$), i.e. within a range of $kqT_{KO} > t_l > (k-1)qT_{KO}$ and $l = (k-1)q+1, \ldots, kq$, respectively;

= constant speed value dependent upon the selected velocity sensor.

Corrected course angle $C\theta_{k,k-1}$:

$$C\theta_{k,k-1} = \theta M_{k,k-1} - C(\theta)_{k-1} - DF(\theta)_{k-1} \quad (51)$$

$k = 1, 2, 3, \ldots$ wherein $C\theta_{k,k-1}$ = corrected course angle during the Kalman interval ($t_k = kT_{KA}$, $t_{k-1} = (k-1)T_{KA}$), i.e. within a range of $kqT_{KO} > t_l > (k-1)qT_{KO}$ and $l = (k-1)q+1, \ldots, kq$, respectively;

$\theta M_{k,k-1}$ = measured plausible course angle during the Kalman interval ($t_k = kT_{KA}$, $t_{k-1} = (k-1)T_{KA}$), i.e. within a range of $kqT_{KO} > t_l > (k-1)qT_{KO}$ and $l = (k-1)q+1, \ldots, kq$, respectively;

$C(\theta)_{k-1}$ = correction value for the measured plausible course angle at time $t_{k-1} = (k-1)T_{KA}$;

$DF(\theta)_{k-1}$ = deterministic course angle error at time $t_{k-1} = (k-1)T_{KA}$.

Vehicle position (position fix):

Position fixes themselves are not corrected.

Corrected, discrete-time base navigation system → corrected, discrete-time system equations:

Corresponding to Equations (7a) and (7b), Equations (49) through (51) here yield $$CVN_{k,k-1} = CV_{k,k-1} \cdot \cos C\theta_{k,k-1} \quad (52a)$$

$$CVE_{k,k-1} = CV_{k,k-1} \cdot \cos C\theta_{k,k-1} \quad (52b)$$

where $CVN_{k,k-1}$ and $CVE_{k,k-1}$ are corrected vehicle speeds in the North (N) and East (E) directions, respectively, during the Kalman interval ($t_k = kT_{KA}$, $t_{k-1} = (k-1)T_{KA}$), i.e. within a range of $kqT_{KO} > t_l > (k-1)qT_{KO}$ and $l = (k-1)q+1, \ldots, kq$, respectively.

Corrected, discrete-time measurement (bearing) equations

Analogously to Equations (8a) and (8b), a comparison of the position bearing data ($RNS_i$, $RES_i$) with the corrected vehicle position ($CRN_i$, $CRE_i$) to be calculated by means of the dead reckoning calculation shown below, here results in $$CZN_l = \begin{cases} RNS_l - CRN_l^{FOA}; \, l = l_i = \dfrac{T_i}{T_{KO}} = k_i q \\ 0; \quad \text{at other times} \end{cases} \quad (53a)$$

$$CZE_l = \begin{cases} RES_l - CRE_l^{FOA}; \, l = l_i = \dfrac{T_i}{T_{KO}} = k_i q \\ 0; \quad \text{at other times} \end{cases} \quad (53b)$$

$i = 1, 2, 3, \ldots$ $CZN_l$ and $CZE_l$ are "corrected" position differences in the north (N) and east (E) directions, respectively, at time $t_l = lT_{KO}$.

The dead reckoning calculation in the corrected navigation system can again be effected according to the above-described two methods.

METHOD 1

Rectangular integration according to Equations (40) and (40b)

The dead reckoning position at time $t_{l+1} = (l+1)T_{KO}$, using Equations (52a) and (52b) is as follows:

$$CRN_{l+1}^{FOA} = CRN_l^{FOA} + \quad (54a)$$

$$\begin{cases} CVN_{l+1} \cdot T_{KO}; \, l = \dfrac{t_l}{T_{KO}} = 0, 1, 2, 3, \ldots \\ CVN_{l+1} \cdot T_{KO} - C(RN)_i; \, l = l_i = \dfrac{T_i}{T_{KO}} = k_i q \end{cases}$$

$$CRE_{l+1}^{FOA} = CRE_l^{FOA} + \quad (54b)$$

$$\begin{cases} CVE_{l+1} \cdot T_{KO}; \, l = \dfrac{t_l}{T_{KO}} = 0, 1, 2, 3, \ldots \\ CVE_{l+1} \cdot T_{KO} - C(RE)_i; \, l = l_i = \dfrac{T_i}{T_{KO}} = k_i q \end{cases}$$

$i = 1, 2, 3, \ldots$

METHOD 2

Trapezoidal integration according to Equations (41a) and (41b)

Here one obtains, at time $t_{l+1} = (l+1)T_{KO}$, using Equations (52a) and (52b):

$$CRN_{l+1}^{FOA} = CRN_l^{FOA} + \quad (55a)$$

$$\begin{cases} [CVN_{l+1} + CVN_l] \cdot \dfrac{T_{KO}}{2}; \, l = \dfrac{t_l}{T_{KO}} = 0, 1, 2, 3, \ldots \\ [CVN_{l+1} + CVN_l] \cdot \dfrac{T_{KO}}{2} - C(RN)_i; \, l = l_i = \dfrac{T_i}{T_{KO}} = k_i q \end{cases}$$

$$CRE_{l+1}^{FOA} = CRE_l^{FOA} + \quad (55b)$$

$$\begin{cases} [CVE_{l+1} + CVE_l] \cdot \dfrac{T_{KO}}{2}; \, l = \dfrac{t_l}{T_{KO}} = 0, 1, 2, 3, \ldots \\ [CVE_{l+1} + CVE_l] \cdot \dfrac{T_{KO}}{2} - C(RE)_i; \, l = l_i = \dfrac{T_i}{T_{KO}} = k_i q \end{cases}$$

$i = 1, 2, 3, \ldots$

For this, the following starting conditions must be suitably given:

$CRN_O = RN_O$ $CRE_O = RE_O$ $CV_O = V_O$ $C\theta_O = \theta_O$

The position correction values $C(RN)_l$ and $C(RE)_l$, $l = l_i = T_i/_{KO} = k_i q$; $i = 1, 2, 3, \ldots$ in Equations (54) and (55) are calculated in the same manner as correction values $C(V)_k$ and $C(\theta)_k$, (where k=1, 2, 3, ...) by means of the modified discrete-time Kalman filter as formulated below.

Modified discrete-time Kalman filter algorithms (simultaneous bearings processing) for the corrected navigation system After setting up the error equations for the corrected navigation system by use of the error propagation theorem and subsequently setting up the error models, the space state representations of the discrete-time system and measurement (bearing) error equations are effected according to the procedures for the uncorrected case. These equations constitute the prerequisite for use of the modified discrete-time Kalman filter as formulated below for the corrected navigation system.

Recursive prediction (extrapolation) algorithm for an a priori system error estimate Corrected a priori estimating error covariance matrix $CP_k^*$ at time $t_k = kT_{KA}$:

$$CP_k^* = C\Phi_{k,k-1} \cdot \left( CP_{k-1} + CD(t_K) \cdot \overline{Q} \cdot CD^T(t_K) \cdot \frac{T_{KA}}{2} \right) \cdot \quad (56)$$

$$C\Phi_{k,k-1}^T + CD(t_K) \cdot \overline{Q} \cdot CD^T(t_K) \cdot \frac{T_{KA}}{2}$$

where $CP_0 = P_0$ is suitably given according to Equation (44).

$$C\Phi_{k,k-1} = \prod_{T=Kq}^{(k-1)q+1} C\Phi_{l,l-1} \quad (57)$$

where $$C\Phi_{l,l-1} = I + CA(t_l) \cdot T_{KO} \left( + \frac{CA^2(t_l)}{2} \cdot T_{KO}^2 + \ldots \right) \quad (58)$$

l = 1, 2, 3, ...;
I = unit matrix;
$CA(t_l)$ = corrected system matrix at time $t_l = lT_{KO}$
$CD(t_k)$ = corrected system noise input matrix at time $t_k = kT_{KA}$.

with
$C\theta_l$ according to Equation (51),
$CVN_l$ according to Equation (52a),
$VCE_l$ according to Equation (52b), and
$\overline{Q}$ according to Equation (25).

Recursive algorithms for the correction of the a priori system error estimate by way of measurements (position fixes):

Corrected amplification matrix $CB_k$ at time $t_k = kT_{KA}$:

$$CB_k = \begin{cases} CP_k^* \cdot M^T \cdot [M \cdot CP_k^* \cdot M^T + V]^{-1}; & k = k_i = \frac{T_i}{T_{KA}} \\ 0 & \text{at other times} \end{cases} \quad (59)$$

i = 1, 2, 3, ...
k = 1, 2, 3, ...
with
M according to Equation (24) and
V according to Equation (39).
Correction value vector $\underline{C}_k$ at time $t_k = kT_{KA}$:

$$\underline{C}_k = \underline{C}_{k-1} + \begin{cases} CB_k \cdot \underline{CZ}_k; & k = k_i = \frac{T_i}{T_{KA}} \\ 0 & \text{; at other times} \end{cases} \quad (60)$$

i = 1, 2, 3, ...
k = 1, 2, 3, ...
where $\underline{C}_k = \underline{O}$: starting conditions $$\underline{C}_k = (C(RN)_k, C(RE)_k, C(V_1)_k, C(\theta_1)_k, C(\theta_2)_k, C(\epsilon)_k)^T \quad (61)$$

$$\underline{C}_{k-1} = (O, O, \chi_{k,k-1} \cdot C(V_1)_{k-1}, C(\theta_1)_{k-1}, C(\theta_2)_{k-1}, C(\epsilon)_{k-1})^T \quad (62)$$

with the limit conditions:

$$|C(V_1)_k - \chi_{k-1,k} \cdot C(V_1)_{k-1}| < \gamma V_1, \quad (63)$$

$$|C(\theta_1)_k - C(\theta_1)_{k-1}| < \gamma \theta_1,$$

$$|C(\theta_2)_k - C(\theta_2)_{k-1}| < \gamma \theta_2,$$

$$|C(\epsilon)_k - C(\epsilon)_{k-1}| < \gamma \epsilon,$$

and where $$\left. \begin{array}{l} \gamma V_1 \\ \gamma \theta_1 \\ \gamma \theta_2 \\ \gamma \epsilon \end{array} \right\} = \text{constant, sensor specific values}$$

and $$\underline{CZ}_k = (CZN_k, CZE_k)^T \quad (64)$$

with
$CZN_k$ according to Equation (53a)
$CZE_k$ according to Equation (63b).

The finally obtained "optimum" course and velocity correction values then are:

$$C(V)_k \leftarrow C(V_1)_k \quad (65)$$

$$C(\theta)_k \leftarrow C(\theta_1)_k + C(\theta_2)_k \quad (66)$$

Corrected a posteriori estimation error covariance matrix $CP_k$ at time $t_k = kT_{KA}$:

$$CP_k = \tfrac{1}{2} \cdot (\overline{CP_k} + \overline{CP_k}^T) \quad (67)$$

with $$\overline{CP_k} = \quad (68)$$

$$\begin{cases} (I - CB_k \cdot M) \cdot CP_k^* \cdot (I - CB_k \cdot M)^T + CB_k \cdot V \cdot CB_k^T; \\ \quad k = k_i = \frac{T_i}{T_{kA}} \\ CP_k^* \quad \text{at other times} \end{cases}$$

i = 1, 2, 3, ...
k = 1, 2, 3, ...

For the more general use according to FIG. 1, where, quasi simultaneously, a plurality of vehicle navigation data for bearings, e.g. position and/or course angle and/or velocity values from radio and/or satellite navigation systems, are available, the changes or additions resulting therefrom will be given below in model forming and Kalman filter algorithms.

The individual bearing values are now modelled as follows (instead of according to Equations (5), (6)):

Position measurement data checked for plausibility for position bearings $RNS^{(jP)}(t)$, $RES^{(jP)}(t)$:

$$RNS^{(jP)}(t) = RN(t) + \Delta RNS^{(jP)}(t) \tag{69a}$$

$$RES^{(jP)}(t) = RE(t) + \Delta RES^{(jP)}(t) \tag{69b}$$

where
$RN(t)$ and $RE(t)$ are error-free vehicle positions in the north (N) and (E) directions, respectively;
$\Delta RNS^{(jP)}(t)$ and $\Delta ES^{(jP)}(t)$ are the $jP^{th}$ position measurement (bearing) errors in the north (N) and east (E) directions, respectively; and
$jP = 1, \ldots$ NP is the number of quasi simultaneously available position bearing data.

Course angle measurement data checked for plausibility for course angle bearings $\theta S^{(j\theta)}(t)$:

$$\theta S^{(j\theta)}(t) = \theta(t) + \Delta \theta S^{(j\theta)}(t) \tag{70}$$

where
$\theta S(t)$ is the error-free course angle;
$\Delta \theta S^{(j\theta)}(t)$ is the $j\theta^{th}$ course angle measurement (bearing) error; and
$j\theta = 1, \ldots, N\theta$ is the number of quasi simultaneously available course angle bearing data.

Velocity measurement data checked for plausibility for velocity bearings $VS^{(jV)}(t)$:

$$VS^{(jV)}(t) = V(t) + \Delta VS^{(jV)}(t) \tag{71}$$

where
$V(t)$ is the error-free vehicle velocity
$\Delta VS^{(jV)}(t)$ is the $jV^{th}$ velocity (bearing) measurement error; and
$jV = 1, \ldots, NV$ is the number of quasi simultaneously available velocity bearing data.

In deviation from Equations (8a) and (8b), one now obtains the following continuous-time measurement (bearing) equations:

The position bearing equations result from comparisons of the positions obtained as a result of dead reckoning ($RN^{FOA}(t)$, $RE^{FOA}(t)$) with the position bearing data ($RNS^{(jP)}(t)$, $RES^{(jP)}(t)$):

$$ZN^{(jP)}(t) = RNS^{(jP)}(t) - RN^{FOA}(t) \tag{72a}$$

$$ZE^{(jP)}(t) = RES^{(jP)}(t) - RE^{FOA}(t) \tag{72b}$$

$jP = 1, \ldots, NP$
where $ZN^{(jP)}(t)$ and $ZE^{(jP)}(t)$ is the $jP^{th}$ deviation between the dead reckoning position and the $jP^{th}$ bearing position in the north (N) and east (E) directions, respectively.

The course angle bearing equations are obtained by comparing the course angle measurement signals ($\theta M(t)$) with the course angle bearing data ($\theta S^{(j\theta)}(t)$):

$$Z\theta^{(j\theta)}(t) = \theta S^{(j\theta)}(t) - \theta M(t) \tag{73}$$

$j\theta = 1, \ldots, N\theta$
where $Z\theta^{(j\theta)}(t)$ is the $j\theta^{th}$ difference between the course angle measurement signal and the $j\theta^{th}$ course angle bearing value.

The velocity bearing equations are obtained correspondingly in that the velocity measurement signals ($VM(t)$) are compared with the velocity bearing data ($VS^{(jV)}(t)$):

$$ZV^{(jV)}(t) = VS^{(jV)}(t) - VM(t) \tag{74}$$

$jV = 1, \ldots, NV$
where $ZV^{(jV)}(t)$ is the $jV^{th}$ deviation between velocity measurement signal and $jV^{th}$ velocity bearing value.

Continuous-time Error Equations

Instead of Equations (10a) and (10b), the use of the error propagation theorem for Equations (72a) to (74) will provide the following measurement bearing error equations:
Error due to position bearings:

$$\Delta ZN^{(jP)}(t) = \Delta RNS^{(jP)}(t) - \Delta RN(t) = ZN^{(jP)}(t) \tag{75a}$$

$$\Delta ZE^{(jP)}(t) = \Delta RES^{(jP)}(t) - \Delta RE(t) = ZE^{(jP)}(t) \tag{75b}$$

$jP = 1, \ldots, NP$
where $\Delta ZN^{(jP)}(t)$ and $\Delta ZE^{(jP)}(t)$ are the $jP^{th}$ position error differences in the north (N) and east (E) directions, respectively.
Error due to course angle bearings:

$$\Delta Z\theta^{(j\theta)}(t) = \Delta \theta S^{(j\theta)}(t) - \Delta \theta(t) = Z\theta^{(j\theta)}(t) \tag{76}$$

$j\theta = 1, \ldots, N\theta$
where $\Delta Z\theta^{(j\theta)}(t)$ is the $j\theta^{th}$ course angle error difference.
Error due to velocity bearings:

$$\Delta ZV^{(jV)}(t) = \Delta VS^{(jV)}(t) - \Delta V(t) = ZV^{(jV)}(t) \tag{77}$$

$jV = 1, \ldots, NV$
where $\Delta ZV^{(jV)}(t)$ is the $jV^{th}$ velocity error difference.

The mathematical model formation for the individual bearing errors is now effected, in deviation from Equation (13), as follows:

It is assumed that all errors occurring in the bearings can be described by Gaussian white, i.e. normally distributed, (time) uncorrelated, noise. The following error models then result:

Position bearing error models (in vector representation):

$$\underline{\Delta RS}^{(jP)}(t) = \begin{bmatrix} \Delta RNS^{(jP)}(t) \\ \Delta RES^{(jP)}(t) \end{bmatrix} = \begin{bmatrix} \Delta RNSWR^{(jP)}(t) \\ \Delta RESWR^{(jP)}(t) \end{bmatrix} = \underline{\Delta RSWR}^{(jP)}(t) \tag{78}$$

where $\underline{\Delta RSWR}^{(jP)}(t) \sim N[\underline{0}; VP^{(jP)}(t)]$ and $$VP^{(jP)}(t) = VP^{(jP)} = \begin{bmatrix} (\sigma_N^{(jP)})^2 & 0 \\ 0 & (\sigma_E^{(jP)})^2 \end{bmatrix}, jP = 1, \ldots, NP.$$

This means that the vectors of the position error components ($\Delta RNSWR^{(jP)}(t)$, $\Delta RESWR^{(jP)}(t)$; $jP = 1, \ldots, NP$) are each developed by stationary white noise with normal (N) distributions, shown in the abbreviated form by mean vectors O and the covariance or spectral density matrices $VP^{(jP)}$ with individual variances in the north (N) and east (E) directions $(\sigma_N^{(jP)})^2$ and $(\sigma_E^{(jP)})^2$.

Course angle bearing error models:

$$\Delta\theta S^{(j\theta)}(t) = \Delta\theta SWR^{(j\theta)}(t) \qquad (79)$$

where $$\Delta\theta SWR^{(j\theta)}(t) \sim N[O; (\sigma_\theta S^{(j\theta)})^2]$$

$$j\theta = 1, \ldots, N\theta$$

is the abbreviated form for the course angle bearing error simulation $(\Delta\theta SWR^{(j\theta)}(t); j\theta=1, \ldots, N\theta)$ as stationary white noise with normal (N) distributions, O mean values and spectral power densities or variances $(\sigma_\theta S^{(j\theta)})^2$, respectively.

Velocity bearing error models:

$$\Delta VS^{(jV)}(t) = \Delta VSWR^{(jV)}(t) \qquad (80)$$

where $$\Delta VSWR^{(jV)}(t) \sim N[O, (\sigma_{VS}^{(jV)})^2]$$

$$jV = 1, \ldots, NV$$

is the abbreviated form for the velocity bearing error simulation $(\Delta VSWR^{(jV)}(t); jV=1, \ldots, NV)$ as stationary white noise with normal (N) distributions, O mean values and spectral power densities or variances $(\sigma_{VS}^{(jV)})^2$, respectively.

Furthermore, in this connection, assumptions are being made that the errors $\Delta\theta_3(t)$ and $\Delta\theta SWR^{(j\theta)}(t)$; $j\theta=1, \ldots, N\theta$, as well as the errors $\Delta V_2(t)$ and $\Delta VSWR^{(jV)}(t)$; $jV=1, \ldots, NV$ are uncorrelated with one another.

By using Equations (78) to (80) in Equations (75) to (77), the following continuous-time measurement (bearing) error equation system is obtained instead of Equations (15a) and (15b):

$$\Delta ZN^{(jP)}(t) = -\Delta RN(t) + \Delta RNSWR^{(jP)}(t) \qquad (81a)$$

$$\Delta ZE^{(jP)}(t) = -\Delta RE(t) + \Delta RESWR^{(jP)}(t) \qquad$$

$$jP = 1, \ldots, NP; \qquad (81b)$$

$$\Delta Z\theta^{(j\theta)}(t) = -\Delta\theta_1(t) - \Delta\theta_2(t) = \Delta\theta_3(t) + \Delta\theta SWR^{(j\theta)}(t)$$

$$j\theta = 1, \ldots, N\theta; \qquad (82)$$

$$\Delta ZV^{(jV)}(t) = -\Delta V_1(t) - \Delta V_2(t) + \Delta VSMR^{(jV)}(t) \qquad (83)$$

$$jV = 1, \ldots, NV.$$

For the space state representation of the continuous-time measurement (bearing) error equations (Equations (81) to (83)) according to Equation (21), the corresponding vectors and matrices (Equations (18), (19), (24) and (26)) must be newly defined. The following determinations are favorable for microcomputer realization:

Measurement (bearing) vector (instead of Equation (18)):

$$\underline{\Delta Z}(t) = (\underline{\Delta ZP}^{(jP)}(t) | \underline{\Delta Z\theta}^{(j\theta)}(t) | \underline{\Delta ZV}^{(jV)}(t))^T \qquad (84)$$

where $$\underline{\Delta ZP}^{(jP)}(t) = (\Delta ZN^{(jP)}(t), \Delta ZE^{(jP)}(t))^T \qquad (84a)$$

$$jP = 1, \ldots, NP;$$

$$\underline{\Delta Z\theta}^{(j\theta)}(t) = \Delta Z\theta^{(j\theta)}(t) \qquad (84b)$$

$$j\theta = 1, \ldots, N\theta;$$

$$\underline{\Delta ZV}^{(jV)}(t) = \Delta ZV^{(jV)}(t) \qquad (84c)$$

$$jV = 1, \ldots, NV.$$

Measurement (bearing) matrix (instead of Equation (24)):

$$M(t) = M = (MP^{(jP)} | M\theta^{(j\theta)} | MV^{(jV)})^T \qquad (85)$$

where $$MP^{(jP)} = \begin{pmatrix} -1 & 0 & 0 & 0 & 0 & 0 \\ 0 & -1 & 0 & 0 & 0 & 0 \end{pmatrix} \qquad (85a)$$

$$jP = 1, \ldots, NP;$$

$$M\theta^{(j\theta)} = (0\ 0\ 0\ -1\ -1\ 0) \qquad (85b)$$

$$j\theta = 1, \ldots, N\theta;$$

$$MV^{(jV)} = (0\ 0\ -1\ 0\ 0\ 0) \qquad (85c)$$

$$jV = 1, \ldots, NV.$$

Measurement (bearing) noise vector (instead of Equation (19)):

$$\underline{V}(t) = (\underline{VP}^{(jP)}(t) | \underline{V\theta}^{(j\theta)}(t) | \underline{VV}^{(jV)}(t))^T \qquad (86)$$

where $$\underline{VP}^{(jP)}(t) = (\Delta RNSWR^{(jP)}(t), \Delta RESWR^{(jP)}(t))^T \qquad (86a)$$

$$jP = 1, \ldots, NP;$$

$$\underline{V\theta}^{(j\theta)}(t) = (\Delta\theta SWR^{(j\theta)}(t), \Delta\theta_3(t))^T \qquad (86b)$$

$$j\theta = 1, \ldots, N\theta;$$

$$\underline{VV}^{(jV)}(t) = (\Delta VSWR^{(jV)}(t), \Delta V_2(t))^T \qquad (86c)$$

$$jV = 1, \ldots, NV.$$

Measurement (bearing) noise input matrix (new):

$$S(t) = S = (SP^{(jP)} | S\theta^{(j\theta)} | SV^{(jV)})^T \qquad (87)$$

where $$SP^{(jP)} = \begin{pmatrix} 1 & 0 \\ 0 & 1 \end{pmatrix} \qquad (87a)$$

$$jP = 1, \ldots, NP;$$

$$S\theta^{(j\theta)} = (1\ -1) \qquad (87b)$$

$$j\theta = 1, \ldots, N\theta;$$

$$SV^{(jV)} = (1\ -1) \qquad (87c)$$

$$jV = 1, \ldots, NV.$$

Measurement (bearing) error equation (analogous to Equation (21)):

Combination of Equations (84) to (87) and (16) provides:

$$\Delta Z(t) = M \cdot \Delta X(t) + \underline{V}(t) \tag{88}$$

where $\underline{V}(t) = \underline{S} \cdot V(t)$ according to Equations (86) and (87).

Measurement (bearing) noise matrix (instead of Equation (26)):

By using Equations (78) to (80), (11) and (12) as well as (86) and (87), the following results:

$$V(t) = E\{\underline{V}(t) \cdot \underline{V}^T(t)\} = S \cdot E\{\overline{V}(t) \cdot \overline{V}^T(t)\} \cdot S^T \tag{89}$$
$$= S \cdot \overline{V}(t) \cdot S^T$$

with $$\overline{V}(t) = \overline{V} = \begin{pmatrix} VP^{(jP)} & 0 & 0 \\ 0 & V\theta^{(j\theta)} & 0 \\ 0 & 0 & VV^{(jV)} \end{pmatrix} \tag{90}$$

where $$E\{\underline{V}(t)\} = S \cdot E\{\overline{V}(t)\} = O$$

and $$VP^{(jP)} = \begin{pmatrix} (\sigma_N^{(jP)})^2 & 0 \\ 0 & (\sigma_E^{(jP)})^2 \end{pmatrix} \tag{90a}$$

$jP = 1, \ldots, NP;$ $$V\theta^{(j\theta)} = \begin{pmatrix} (\sigma_{\theta S}^{(j\theta)})^2 & 0 \\ 0 & q_{\theta 3}^2 \end{pmatrix} \tag{90b}$$

$j\theta = 1, \ldots, N\theta;$ $$VV^{(jV)} = \begin{pmatrix} (\sigma_{VS}^{(jV)})^2 & 0 \\ 0 & q_{V2}^2 \end{pmatrix} \tag{90c}$$

$jV = 1, \ldots, NV.$

The conversion of the continuous-time system and measurement (bearing) error (differential) equations according to Equations (20) and (88) to discrete-time difference equations is effected, even with the quasi simultaneous availability of a plurality of navigation data for bearings, by means of the formalisms of Equations (28) to (39). Here again it is assumed that all bearings are taken exclusively at discrete points in time $t = T_i$; $1, 2, 3, \ldots$ In this way, the continuous-time measurement (bearing) error equation (88) changes to $$\Delta \underline{Z}_k = \begin{cases} M \cdot \Delta X_k + \underline{V}_k; & k = k_i = \dfrac{T_i}{T_{KA}} \\ \underline{0}; & \text{at other times} \end{cases} \tag{38'}$$

where
$i = 1, 2, 3, \ldots$
$k = 1, 2, 3, \ldots$ according to Equation (28)
$\underline{V}_k = S \cdot V_k$ according to Equation (88)
M is according to Equation (85);
and Equations (89) and (90) apply for the discrete-time measurement (bearing) noise matrix.

The discrete-time dead reckoning calculation according to Equations (40) and (41), respectively, which employs the actual velocity and course informations from the velocity sensor and the direction sensor remains just as uninfluenced from the quasi simultaneous multiple bearings.

DISCRETE-TIME KALMAN FILTER ALGORITHMS

Instead of a discrete-time Kalman filter with simultaneous measurement (bearing) data processing employed heretofore, it is here possible to use (and thus save computer time) an algorithm with sequential measuring (bearing) data processing.

Starting from the recursive prediction (extrapolation) equations for the a priori system error estimate according to Equations (42) to (44), one now obtains, in deviation from Equations (45) to (48), the following algorithms for correction of the a priori systmem error estimate by measurements (bearings):

Amplification matrices $B_k^{(j)}$ at time $t_k = kT_{KA}$:

$$B_k^{(j)} = \begin{cases} P_k^{(j)} \cdot (M^{(j)})^T \cdot (VA_k^{(j)})^{-1}; & k = k_i = \dfrac{T_i}{T_{KA}} \\ 0; & \text{at other times} \end{cases} \tag{91}$$

where $$VA_m^{(j)} = M^{(j)} \cdot P_x^{(j)} \cdot (M^{(j)})^T + V^{(j)} \tag{91a}$$

A posteriori estimation error $\Delta \underline{X}_k^{(j+1)}$ at time $t_k = kT_{KA}$:

$$\Delta \underline{\hat{X}}_k^{(j+1)} = \Delta \underline{\hat{X}}_k^{(j)} + \begin{cases} B_k^{(j)} \cdot [\underline{Z}_k^{(j)} - M^{(j)} \cdot \Delta \underline{\hat{X}}_k^{(j)}]; & k = k_i = \dfrac{T_i}{T_{KA}} \\ \underline{0}; & \text{at other times} \end{cases} \tag{92}$$

A posteriori estimation error covariance matrices $P_k^{(j+1)}$ at time $t_k = kT_{KA}$:

$$P_k^{(j+1)} = \begin{cases} BM_k^{(j)} \cdot P_k^{(j)} \cdot (BM_k^{(j)})^T + B_k^{(j)} \cdot V^{(j)} \cdot (B_k^{(j)})^T; & k = k_i = \dfrac{T_i}{T_{KA}} \\ P_k^{(j)}; & \text{at other times} \end{cases} \tag{93}$$

where $$BM_k^{(j)} = (I - B_k^{(j)} M^{(j)}) \tag{93a}$$

$V^{(j)} = S^{(j)} \cdot \overline{V}^{(j)} \cdot (S^{(j)})^T$ according to Equation (89);
$i = 1, 2, 3, \ldots$,
$k = 1, 2, 3, \ldots$, according to Equation (23);
$j = (jP), (j\theta), (jV) = 1, \ldots, p;$
$jP = 1, \ldots, NP;$
$j\theta = 1, \ldots, N\theta$
$jV = 1, \ldots, NV;$
$P = (NP + N\theta + NV);$
$M^{(j)}$ is according to Equation (85);

$S^{(j)}$ is according to Equation (87);
$V^{(j)}$ is according to Equation (90);
$\underline{Z}_k^{(j=jP)} = \underline{ZP}_k^{(jP)} = (ZN_k^{(jP)}, ZE_k^{(jP)})^T$ according to Equations (72a) and (72b);
$\underline{Z}_k^{(j=j\theta)} = \underline{Z\theta}_k^{(j\theta)} = Z\theta_k^{(j\theta)}$ according to Equation (73);
$\underline{Z}_k^{(j=jV)} = \underline{ZV}_k^{(jV)} = ZV_k^{(jV)}$ according to Equation (74);

and the

Marginal conditions
$P_k^{(j=1)} = P_k^*$ according to Equation (43);
$\Delta\underline{\hat{X}}_k^{(j=1)} = \Delta\underline{\hat{X}}_k^*$ according to Equation (42);

$$\Delta\hat{\underline{x}}_k = \Delta\underline{\hat{x}}_k^{(j=p+1)}; \tag{94}$$

$$P_k = \tfrac{1}{2}[P_k^{(j=p+1)} + (P_k^{(j=p+1)})^T] \tag{95}$$

With the modified algorithms for the corrected navigation system, the following changes and additions, respectively, result, on the basis of the multiple bearings:

In deviation from Equations (53a) and (53b), one here obtains, analogously to the procedure with Equations (72a) to (74), the corrected discrete-time measurement (bearing) equations.

Corrected discrete-time position bearing equations:

$$\underline{CZP}_1^{(jP)} = (CZN_1^{(jP)}, CZE_1^{(jP)})^T \tag{96}$$

with $$CZN_l^{(jP)} = \begin{cases} RNS_l^{(jP)} - CRN_l^{FOA}; l = l_i = \dfrac{T_i}{T_{KO}} k_i q \\ 0 \qquad ; \text{at other times} \end{cases} \tag{96a}$$

$$CZE_l^{(jP)} = \begin{cases} RES_l^{(jP)} - CRE_l^{FOA}; l = l_i = \dfrac{T_i}{T_{KO}} k_i q \\ 0 \qquad ; \text{at other times} \end{cases} \tag{96b}$$

and $$\left.\begin{array}{l} jP = 1, \ldots, NP, \\ l = 1, 2, 3, \ldots \\ i = 1, 2, 3, \ldots \end{array}\right\}$$

and
$jP = 1, \ldots, NP,$
$P = 1, 2, 3, \ldots$
$i = 1, 2, 3, \ldots$ $CZN_1^{(jP)} = jp^{th}$ deviation between corrected dead reckoning
$CZE_1^{(jP)} =$ position and $jp^{th}$ bearing position in the north (N) and east (E) directions at time $t_1 = 1T_{KO}$.
$CRN_1^{FOA} =$ are according to Equations (54a) and (54b) or
$CRE_1^{FOA} =$ (55a) and (55b), respectively.

Corrected discrete-time course angle bearing equations:

$$\underline{CZ\theta}_1^{(j\theta)} = CZ\theta_1^{(j\theta)} \tag{97}$$

with $$CZ\theta_l^{(j\theta)} = \begin{cases} \theta S_l^{(j\theta)} - C\theta_l; l = l_i = \dfrac{T_i}{T_{KO}} k_i q \\ 0 \qquad ; \text{at other times} \end{cases} \tag{97a}$$

and $$\left.\begin{array}{l} j\theta = 1, \ldots, N\theta, \\ l = 1, 2, 3, \ldots \\ i = 1, 2, 3, \ldots \end{array}\right\} \text{according to Equation (28)}$$

as well as $CZ\theta_1^{(j\theta)}$ is the $j\theta^{th}$ difference between corrected course angle measurement signal and the $j\theta^{th}$ course angle bearing value at time $t_1 = lT_{KO}$; and $C\theta_1$ is according to Equation (51).

Corrected discrete-time velocity bearing equations:

$$\underline{CZV}_1^{(jV)} = CZV_1^{(jV)} \tag{98}$$

with $$CZV_l^{(jV)} = \begin{cases} VS_l^{(jV)} - CV_l; l = l_i = \dfrac{T_i}{T_{KO}} k_i q \\ 0 \qquad ; \text{at other times} \end{cases} \tag{98a}$$

ps and $$\left.\begin{array}{l} jV = 1, \ldots, NV \\ l = 1, 2, 3, \ldots \\ i = 1, 2, 3, \ldots \end{array}\right\} \text{according to Equation (28)}$$

as well as $CZV_1^{(jV)}$, which is the $jV^{th}$ deviation between corrected velocity measurement signal and the $jV^{th}$ velocity bearing value at time $t_1 = 1T_{KO}$; and $CV_1$ is according to Equation (49).

Dead reckoning in the corrected navigation system is again performed according to Equations (54a) and (54b) or Equations (55a) and (55b), respectively.

The modified discrete-time Kalman filter algorithms will be given below for the corrected naviagation system with the sequential measurement (bearing) data processing appropriate here.

The basis for this is the recursive prediction (extrapolation) algorithm for the a priori system error estimate according to Equations (56) to (58).

Instead of Equations (59) to (68), the following relationships are now obtained as recursive modified algorithms for correction of the a priori system error estimate by the various measurements (bearings).

Corrected amplification matrices $CB_k^{(j)}$ at time $t_k = kT_{KA}$:

$$CB_k^{(j)} = \begin{cases} CP_k^{(j)} \cdot (M^{(j)})^T \cdot (CVA_k^{(j)})^{-1}; k = k_i = \dfrac{T_i}{T_{KA}} \\ 0 \qquad ; \text{at other times} \end{cases} \tag{99}$$

where $$CVA_k^{(j)} = M^{(j)} \cdot CP_k^{(j)} \cdot (M^{(j)})^T + V^{(j)} \tag{99a}$$

Corrected a posteriori estimation errors $\hat{\underline{y}}_k^{(j+1)}$ at time $t_k = kT_{KA}$:

$$\hat{y}_k^{(j+1)} = \hat{y}_k^{(j)} + \begin{cases} CB_k^{(j)} \cdot [C\underline{Z}_k^{(j)} - M^{(j)} \cdot \hat{y}_k^{(j)}]; k = k_i = \dfrac{T_i}{T_{KA}} \\ \underline{0} \quad ; \text{at other times} \end{cases} \quad (100)$$

Corrected a posteriori estimation error covariance matrices $CP_k^{(j+1)}$ at time $t = kT_{KA}$:

$$CP_k^{(j+1)} = \qquad (101)$$

$$\begin{cases} CBM_k^{(j)} \cdot CP_k^{(j)} \cdot (CBM_k^{(j)})^T + CB_k^{(j)} \cdot V^{(j)} \cdot (CB_k^{(j)})^T; k = k_i = \dfrac{T_i}{T_{KA}} \\ CP_k^{(j)}; \text{at other times} \end{cases}$$

with $$CBM_k^{(j)} = (I - CB_k^{(j)} \cdot M^{(j)}) \qquad (102)$$

$V^{(j)} = S^{(j)} \cdot \overline{V}^{(j)} \cdot S^{(j)}$ according to Equation (89);
$i = 1, 2, 3, \ldots$) according to Equation (28);
$k = 1, 2, 3, \ldots$
$j = (jP), (j\theta), (jV) = 1, \ldots, p$;
$jP = 1, \ldots, NP$;
$j\theta = 1, \ldots, N\theta$;
$jV = 1, \ldots, NV$;
$p = (NP + N\theta + NV)$;
$M^{(j)}$ is according to Equation (85);
$S^{(j)}$ is according to Equation (87);
$\overline{V}^{(j)}$ is according to Equation (90);
$\overline{CZ}_k^{(j=jP)}$ is according to Equation (96);
$\overline{CZ}_k^{(j=j\theta)}$ is according to Equation (97);
$\overline{CZ}_k^{(j=jV)}$ is according to Equation (98); and the
Marginal conditions: $CP_k^{(j=1)} = CP_k^*$ according to Equation (56)

$$CP_k^{(j=1)} = CP_k^* \text{ nach Gl. (56)} \qquad (103)$$

$$\hat{y}_k^{(j=1)} = \underline{0}$$

$$CP_k = \tfrac{1}{2}[CP_k^{(j=p+1)} + (CP_k^{(j=p+1)})^T] \qquad (104)$$

$$\underline{C}_k = \underline{C}_{k-1} + \hat{y}_k^{(j=p+1)} \qquad (105)$$

Here, Equation (105) now defines the correction value vector at time $t_k = k \cdot T_{KA}$ with the definitions according to Equations (61) to (63) as well as Equations (65) and (66).

It will be understood that the above description of the present invention is susceptible to various modifications, changes and adaptations, and the same are intended to be comprehended within the meaning and range of equivalents of the appended claims.

What is claimed is:

1. A method for the navigation of a vehicle, the vehicle including: course reference means for furnishing a course angle signal $\theta M$ which represents the direction of the vehicle with reference to an earth-bound coordinate system; longitudinal movement sensor means for detecting longitudinal movement of the vehicle and generating a longitudinal movement signal VM corresponding to the longitudinal movement of the vehicle; position computer means for calculating vehicle position data, segregated into north and east position values, from signals generated by the course reference means and the longitudinal movement sensor means; display means connected to the position computer for displaying vehicle position data calculated by the position computer; and input means including at least one of manual input means and signal receiving means for providing navigation support data including at least one of additional position, course, velocity and path data; said method comprising:

checking the longitudinal movement signal VM and the course angle signal $\theta M$ for plausibility;

adding a known, empirically derived, deterministic velocity error component value DF(V) to the VM signal to produce, a corrected longitudinal movement signal CV;

optimally estimating, with the use of a Kalman filter, the stochastic position and direction errors contained in the VM and $\theta M$ signals and using the estimate of such errors to calculate direction and change-in-direction correction values C($\theta$) and C($\epsilon$), respectively, and north and east position correction values C(RN) and C(RE), respectively;

adding the direction correction value C($\theta$) and a known, empirically derived, deterministic course angle error component value DF($\theta$) to the $\theta M$ signal to produce a corrected course angle signal C$\theta$;

feeding the position correction values C(RN) and C(RE) to the position computer means for use in correcting the position data;

forming corrected north and east component signals CVN and CVE, respectively, from the corrected longitudinal vehicle movement signal CV and from the corrected course angle signal C$\theta$ and feeding the CVN and CVE signals to the position computer means;

calculating, with the use of the position computer means, corrected north and east position coordinate values CRN and CRE, respectively, in dependence of the C(RN) and C(RE) correction values and the CVN and the CVE corrected north and east component signals;

obtaining north and east position bearing data RNS$^{(jP)}$ and RES$^{(jP)}$, respectively, from the input means;

comparing the corrected north and east position coordinate values CRN and CRE with the position bearing data RNS$^{(jP)}$ and RES$^{(jP)}$, respectively, to form north and east position bearing signals CZN$^{(jP)}$ and CZE$^{(jP)}$, respectively; and feeding the CZN$^{(jP)}$ and CZE$^{(jP)}$ signals to the Kalman filter, with the Kalman filter developing the following error model of the vehicle course angle error:

$$\Delta\theta(t) = \Delta\theta_1(t) + \Delta\theta_2(t) + \Delta\theta_3(t),$$

wherein $\Delta\theta_1(t)$ comprises a component of exponentially, time correlated, colored noise; $\Delta\theta_2(t)$ comprises a time linearly variable component representing drift angle with an unknown starting value $\Delta\theta_2(0)$ and an unknown pitch $\epsilon(t)$ representing a random ramp process; and $\Delta\theta_3(t)$ comprises a component of Gaussian white, time uncorrelated, noise; and wherein the component $\Delta\theta_1(t)$ is described by a form filter excited with white noise in a Gauss-Markov process of the first order; and error which is contained in the position bearing data, RNS$^{(jP)}$ and RES$^{(jP)}$ is developed solely by stationary Gaussian white, time uncorrelated, noise.

2. Navigation method as defined in claim 1, wherein the input means provides at least one of course and longitudinal vehicle movement support data, $\theta S^{(j\theta)}$ and $VS^{(jV)}$, respectively, and said method further includes:

comparing at least one of the corrected signals $C\theta$ and $CV$ with a respective one of the provided course and longitudinal vehicle movement support data $\theta S^{(j\theta)}$ and $VS^{(jV)}$ for the generation of at least one of course and vehicle longitudinal movement support signals $CZ\theta^{(j\theta)}$ and $CZV^{(jV)}$, respectively; and feeding such support signals to the Kalman filter, with the Kalman filter developing the following error model for the stochastic component of the course angle error:

$$\Delta\theta(t) = \Delta\theta_1(t) + \Delta\theta_2(t) + \Delta\theta_3(t),$$

wherein $\Delta\alpha_1(t)$ comprises a component of exponentially, time correlated, colored noise; $\Delta\theta_2(t)$ comprises a time linearly variable component representing drift angle with an unknown starting value $\Delta\theta_2(0)$ and unknown pitch $\epsilon(t)$ representing a random ramp process; and $\Delta\theta_3(t)$ comprises a component of Gaussian white, time uncorrelated, noise; and wherein the component $\Delta\theta_1(t)$ is described by a form filter excited with white noise in a Gauss-Markov process of the first order; error which is contained in the support data, $\theta S^{(j\theta)}$ and $VS^{(jV)}$ is developed solely by stationary Gaussian white, time uncorrelated, noise.

3. Naviagation method as defined in claim 1, including:

arranging the Kalman filter for optimum estimation of a stochastic longitudinal vehicle movement error components of the VM signal, with the Kalman filter developing the following error model for the longitudinal vehicle movement error:

$$\Delta V(t) = \Delta V_1(t) + \Delta V_2(t),$$

from which a longitudinal vehicle movement correction value $C(V)$ is calculated, and wherein $\Delta V_1(t)$ is a component of exponentially, time correlated, colored noise and $\Delta V_2(t)$ is a component of Gaussian white, time uncorrelated, noise; the component $\Delta V_1(t)$ is described by a form filter excited by white noise in a Gauss-Markov process of the first order; and adding the correction value $C(V)$ to the VM signal.

* * * * *